United States Patent

Habu

[11] Patent Number: 5,978,189
[45] Date of Patent: Nov. 2, 1999

[54] SUBSTRATE FOR A MAGNETIC RECORDING MEDIUM HAVING LASER BEAM ABSORPTION CHARACTERISTIC AND A MAGNETIC RECORDING MEDIUM USING THE SUBSTRATE

[75] Inventor: Fuyuki Habu, Yonezawa, Japan

[73] Assignee: Asahi Komag Co., Ltd., Tokyo, Japan

[21] Appl. No.: 08/902,478

[22] Filed: Jul. 29, 1997

[30] Foreign Application Priority Data

Jul. 31, 1996 [JP] Japan ................................ 8-201726
Jun. 19, 1997 [JP] Japan ................................ 9-163038

[51] Int. Cl.⁶ .............................. G11B 5/82; B05D 3/00
[52] U.S. Cl. ................................ 360/135; 427/554
[58] Field of Search ........................ 360/131, 135; 427/554, 555

[56] References Cited

U.S. PATENT DOCUMENTS

| | | | |
|---|---|---|---|
| 5,062,021 | 10/1991 | Ranjan et al. | 360/135 |
| 5,108,781 | 4/1992 | Ranjan et al. | 427/53.1 |
| 5,567,484 | 10/1996 | Baumgart et al. | 427/555 |
| 5,582,878 | 12/1996 | Ogawa et al. | 427/554 |
| 5,586,040 | 12/1996 | Baumgart et al. | 364/474.08 |
| 5,595,791 | 1/1997 | Baumgart et al. | 427/554 |
| 5,714,207 | 2/1998 | Kuo | 427/555 |
| 5,726,108 | 3/1998 | Taguchi et al. | 501/5 |
| 5,741,560 | 4/1998 | Ross | 427/555 |

FOREIGN PATENT DOCUMENTS

| | | |
|---|---|---|
| 0 652 554 | 5/1995 | European Pat. Off. . |
| 8-106630 | 4/1996 | Japan . |

OTHER PUBLICATIONS

P. Baumgart, et al., "A New Laser Texturing Technique for High Performance Magnetic Disk Drives", IEEE Transactions on Magnetics, vol. 31, No. 6, Nov. 1995, pp. 2946–2951.

Primary Examiner—Jefferson Evans
Attorney, Agent, or Firm—Oblon, Spivak, McClelland, Maier & Neustadt, P.C.

[57] ABSTRACT

A substrate for a magnetic recording medium. The substrate is a non-magnetic brittle material having a substantially flat surface on which laser marks having a height in a range of 10–500 Å are formed in a landing zone. The laser marks are formed by irradiating a pulsed laser beam having a wavelength capable of being absorbed in the non-magnetic brittle material within a range of substantially circular form having a waist diameter D $\mu$m, and which has a physical property of $0.5 < E^v/(D/20)^2 < 6$ $\mu$J where $E^v$ $\mu$J represents a pulse energy for initiating vaporization of the glass substrate by irradiation of the pulsed laser.

10 Claims, 4 Drawing Sheets

SUBSTRATE FOR A MAGNETIC RECORDING MEDIUM HAVING LASER BEAM ABSORPTION CHARACTERISTIC AND A MAGNETIC RECORDING MEDIUM USING THE SUBSTRATE

BACKGROUND OF THE INVENTION

1. Field of the Invention

The present invention relates to a substrate for a magnetic recording medium and a magnetic recording medium using the substrate.

2. Discussion of Background

There has been a demand for a magnetic recording medium (hereinbelow, referred to as a disk) having a high recording density, along with which it has been necessary to reduce a flying height of a magnetic head (hereinbelow, referred to as a head). In recent years, a flying height of a head from a disk surface of 500 Å or lower, desirably, 300 Å or lower is required. Accordingly, it is necessary that the disk surface is extremely flat in a data zone where the recording/reading of data are effected.

On the other hand, in a contact-start-stop (CSS) method, a head takes off and lands on a disk surface when the rotation of the disk is started or stopped. The disk surface is not smooth, but there are minute projections and recesses called a texture formed to prevent the head from sticking on the disk surface at the time of taking off and landing.

In order to satisfy both requirements of preventing the head from sticking and of the head taking off with a low flying height while a high recording density is maintained, it is necessary to form the texture of minute projections and recesses wherein a dispersion in the height of the projections is small. However, it is not easy to form such texture.

Accordingly, there is proposed a disk wherein the disk surface is divided into a zone in which the head rests at the time of stopping the disk (i.e., a landing zone) and a zone for effecting recording/reading of data (i.e., a data zone), and the texture is formed only in the landing zone while the data zone is left smooth.

The landing zone is formed in an inner peripheral area or an outer peripheral area with a predetermined width on a surface of a doughnut-like disk. The area other than the landing zone in the disk surface is substantially occupied by the data zone.

To form the texture in the disk surface, the texture is formed in a surface of a substrate to be used for the disk. Although a magnetic layer and other required layers are formed on the substrate, the texture formed in the substrate should correctly be transferred on the disk surface. In a case of forming the landing zone in the disk surface, the texture can be formed in the substrate surface at the region just below the landing zone in the disk surface (it is referred to as a landing zone of substrate). In this case, it is unnecessary to form the texture in the data zone in the disk and the data zone has a smooth surface. Accordingly, the corresponding area in the substrate (it is referred to as a data zone of substrate) is also smooth, and such material is suitable for a substrate for a magnetic disk, which is made of a non-magnetic brittle material such as glass having a feature of smoothness in its surface. Accordingly, a substrate for a magnetic recording medium which is formed of such material and has the texture having minute projections and recesses wherein a dispersion in the height of the projections is small, is envisioned.

In forming the texture in the surface of the substrate, there have been proposed a mechanical method using an abrasive material on a substrate of aluminum alloy with NiP plating or a glass substrate, or a chemically treating method to a glass substrate or the like. However, these methods have a disadvantage that the height of projections is not uniform thereby preventing the lowering of a flying height of the head.

Besides the above-mentioned methods, U.S. Pat. No. 5,062,021, U.S. Pat. No. 5,108,781 and Japanese Unexamined Patent Publication JP-A-8-106630 propose a method of forming a texture by using a laser. Further, a paper "A New Laser Texturing Technique for High Performance Magnetic Disk Drives" IEEE Trans. Mag., Vol.31, pp2946–2951,1995 describes related art.

In these documents, metal or alloy is used as the material to be processed by laser. Further, in these documents, the mechanism of forming a texture by applying a laser to such material is as follows. On irradiating laser, there takes place a temperature distribution in an irradiated region with the result of a distribution of surface tension in the radiated area, whereby there occurs a re-arrangement of compositions in correspondence to the surface tension, and solidification follows. In these prior art documents, there is no consideration of a substrate constituted by a brittle material such as a glass substrate, a glass ceramics substrate or a carbon substrate.

EP 0652554A discloses a method of forming a texture by irradiating a laser beam on the surface of a brittle material having a thermal shock fluence threshold level. However, there is no special proposal to control the height of minute projections and the depth of minute recesses in order to form a uniform texture wherein a dispersion of the height of the projections is small.

SUMMARY OF THE INVENTION

It is an object of the present invention to provide a substrate for a magnetic recording medium which is formed of glass, glass ceramics, ceramics or another non-magnetic brittle material and in which a texture comprising minute projections and recesses can be formed by irradiating a pulsed laser beam, wherein a dispersion of the height of the projections is small.

It is a further object of the present invention to provide a magnetic recording medium comprising the above-mentioned substrate on which a magnetic layer and other required layers are formed.

In accordance with the present invention, there is provided a substrate for a magnetic recording medium which comprises a non-magnetic brittle material having a substantially flat surface in which a plurality of laser marks are formed each having a projection of a height H in a range of 10–500 Å in at least a part of it, the laser marks being formed by irradiating a pulsed laser beam having a wavelength capable of being absorbed in the non-magnetic brittle material within a range of substantially circular form having a waist diameter D $\mu$m, and which has a physical property of $0.5 < E_v/(D/20)^2 < 6$ $\mu$J where $E_v$ $\mu$J represents a pulse energy value for initiating vaporization of the substrate by irradiation of the pulsed laser beam.

In the present invention, the substrate for a magnetic recording medium, which is made of a non-magnetic brittle material, is referred to as a non-magnetic brittle substrate.

In this specification, the non-magnetic brittle substrate includes a substrate of non-magnetic brittle material such as glass, glass ceramics, ceramics or the like, or a substrate comprising a non-magnetic brittle material having a thickness sufficient to form laser marks, which is laminated on another material.

The pulsed laser beam used for the present invention means the beam constituted by the repetition of a pulse. In this specification, the energy of a pulse is referred to as an amount of a pulse energy of the pulsed laser beam, or a pulse energy value, or simply, a pulse energy.

The pulsed laser beam used for the present invention may be one having a wavelength capable of being absorbed by the non-magnetic brittle material constituting the substrate, for example, the 4th harmonics of a YAG laser, the 4th harmonics of a YLF laser or the 4th harmonics of a $YVO_4$ laser or the like.

The laser beam used for the present invention is substantially circular in a cross-sectional surface which is perpendicular to an optical axis on the surface of the substrate, and the laser beam has a Gaussian distribution or a distribution similar to the Gaussian distribution wherein the intensity of the energy of the laser beam is the largest at the center and attenuates in the radial direction. A value two times as large as the radius at which the intensity of the energy is $1/e^2$ of the intensity at the center, is called a waist diameter and is represented as D $\mu$m. A symbol e represents the base of a natural logarithm.

In the present invention, the optical axis of the pulsed laser beam to be irradiated is substantially perpendicular to the surface of the substrate.

The laser marks referred to in this description mean lifted portions formed by irradiating the pulsed laser beam onto the surface of the non-magnetic brittle substrate having a substantially flat surface or portions wherein the shape of the surface of the substrate is changed which also include the lifted portions. The laser marks are formed dispersibly in the surface of the substrate to thereby form a texture.

It is preferable that each of the laser marks is in a substantially projected form in the direction out of the substrate, or it has a peripheral portion which is in a substantially projected form in the direction out of the substrate and it has a concave portion at the center of the projected portion.

In order to avoid a sticking phenomenon, to improve durability to CSS and to reduce a flying height of the head, the height H of each of the projections as the laser marks should be 10–500 Å, more preferably, 10–300 Å. It is further preferable that when a dispersion of the height H is represented by a standard deviation σ, σ is 5% or lower of an average value of H, in particular, 3% or lower.

The substrate used for the present invention should have an amount of pulse energy $E_v$ to initiate vaporization when the energy of the pulsed laser is applied wherein $E_v$ is smaller than 6 $\mu$J and larger than 0.5 $\mu$J. When $E_v$ is 6 $\mu$J or more, the dispersion of the height H of the projections becomes large. On the other hand, when $E_v$ is 0.5 $\mu$J or less, vaporization will occur before a sufficient height H of the projections can be formed and a height of 10 Å or more can not be obtained.

In the present invention, the landing zone and the data zone are formed in the substrate for a magnetic recording medium, and the pulsed laser beam is irradiated specifically on the landing zone to form the laser marks whereby a flying height of the head in the data zone is reduced and a danger of the sticking in the landing zone is eliminated simultaneously.

Further, the present invention provides a magnetic recording medium in which a magnetic layer and other required layers are formed on the above-mentioned substrate made of a non-magnetic brittle material.

The height and the shape of the laser marks formed in the surface of the substrate can be retained in the outermost surface of the magnetic recording medium through a barrier layer, an under layer, a magnetic layer, a protective layer, a lubricant layer and so on which are formed on the substrate. For instance, the height and the shape of the laser marks formed in the landing zone of the substrate constitute a texture as a form of projections having substantially the same height and substantially the same shape in the landing zone of the magnetic recording medium. The texture contributes to reduce a frictional force between the magnetic recording medium and the head and to prevent the sticking of the head.

Description will be made as to the shape of the laser marks formed in response to an amount of pulse energy when the pulsed laser beam is applied to a brittle substrate such as a glass substrate or a glass ceramic substrate.

Figure 3:
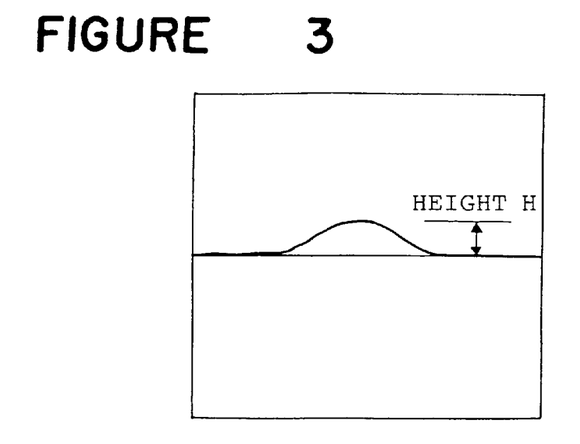
FIG. 3 is a diagram showing a simple lifting type laser mark in cross section.

When an amount of the pulse energy of the pulsed laser beam is increased, the temperature at irradiated portions is increased whereby lifting of the irradiated portions in the substrate surface starts (FIG. 3). This is called a simple lifting type.

Figure 4:
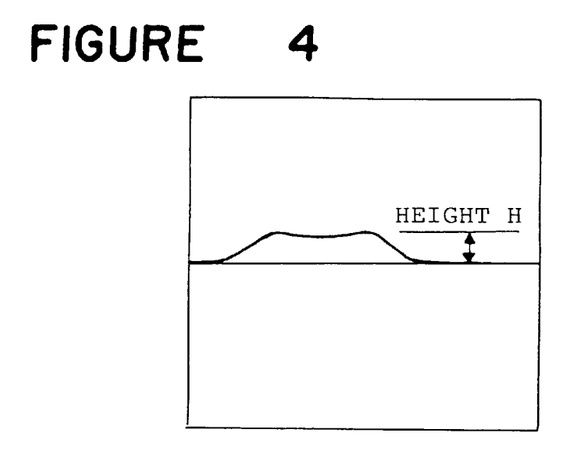
FIG. 4 is a diagram showing a sink type laser mark in cross section.
Figure 5:
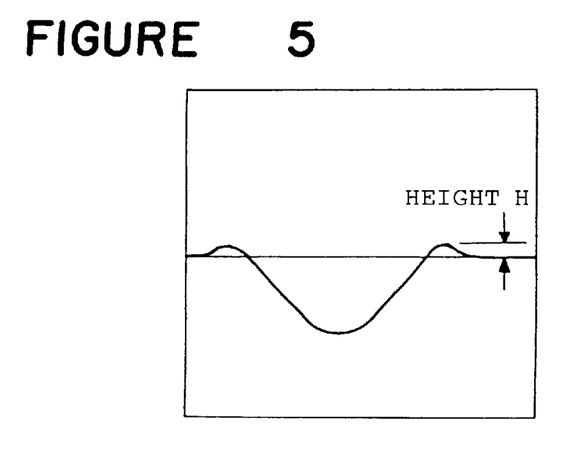
FIG. 5 is a diagram showing a crater type laser mark in cross section.

When the pulsed laser beam having a higher energy is subsequently irradiated and the energy reaches $E_v$, vaporization initiates in the irradiated portions of material, and a recessed portion appears at almost the center of the top of the lifting portion, where the intensity of the irradiated energy is the highest (FIG. 4). This is called a sink type. The energy value of the pulse at the transition from the simple lifting type to the sink type corresponds to the energy $E_v$ to initiate vaporization of the substrate. When the pulsed laser beam having a further higher energy is irradiated, the vaporizing area expands and sinking progresses with the result that each of the laser marks has a shape that the peripheral portion remains lifted in a substantially projected form and a recess is formed at its central portion (FIG. 5). This is called a crater type.

Each of the laser marks has a projecting portion in at least a part of it and the height H of the projecting portion is in a range of 10–500 Å. The height H of the projecting portion is referred to as the height of laser mark or simply, the height. FIGS. 3 to 5 show the height H of various projections wherein an arbitrary scale is used for each of the Figures, therefor, the scales are not common in FIGS. 3 to 5. In FIGS. 4 and 5, the height H indicates the height of peripheral portions.

When a pulsed laser beam is irradiated onto a non-magnetic brittle substrate, there occur changes such as temperature rise, expansion, lifting and so on due to the absorption of the energy of the pulsed laser beam at and around the irradiated portions in the substrate. The rate of change depends on the wavelength and the energy of the laser. Further, they are related to the properties and the compositions of the substrate. In the present invention, the rate of absorbing a laser energy by the substrate is called the sensitivity of the substrate to the laser energy. When the rate of absorbing is high, the sensitivity is high.

According to a result of study, the width of the energy of the laser beam at a time from occurrence of the lifting to the initiation of vaporization is very narrow in a substrate which has not particularly been treated to increase the sensitivity to the laser energy, and the rate of a change in the height of the lifting portion to a change in the energy of the irradiated pulsed laser beam is steep. Accordingly, it is necessary to strictly control the variation of an irradiated energy in order to control the height of the projections within a predetermined range.

On the other hand, it is known that a laser power varies with respect to time. A severe control of variation of an applied energy is restricted by power stability of a laser to be used. A requirement of strictly controlling the variation of the applied energy results an excessively severe request in a production step and reduction of yield, and therefor, it is uneconomical. Formation of the texture with use of a laser in which variation of the power is strictly controlled may be possible under a strictly controlled site such as a R & D site. However, it is not realistic in an industrial beam.

Further, according to a result of study by the inventor, when a commercially available glass substrate which is not treated so as to increase the sensitivity to a laser is used, the height H of projections as laser marks reaches about 1 μm, which is remarkably high in comparison with 500 Å or less, preferably, 300 Å or less as a target height. Accordingly, it is very difficult for a commercially available glass substrate to control the height in a very low range. Further, when the commercially available glass substrate is irradiated by a laser beam, it exhibits a remarkable change of expansion and a lifting which causes cracks and reduction of strength.

In accordance with the present invention, there is provided a substrate which is made of a non-magnetic brittle material such as glass, glass ceramics or the like, and which has a high sensitivity to a pulsed laser energy and initiates vaporization on the application of a lower energy of a pulsed laser beam having a wavelength capable of being absorbed by the material.

In the present invention, the substrate made of glass can be selected from those suitable for magnetic recording medium in the group constituting of soda-aluminosilicate glass, sodalime silicate glass and alkali-containing borosilicate glass. The light absorbing agent used to increase the sensitivity to a pulsed laser may be, $Fe_2O_3$, $CeO_2$, $V_2O_5$, $TiO_2$ and the like and any combination of these compounds can be used for an ultraviolet laser beam used in the present invention.

Such a substrate allows the formation of laser marks having a height H in a range of 10–500 Å with a small dispersion by the irradiation of the pulsed laser. Accordingly, a substrate having a texture suitable for high density recording and a magnetic recording medium having such substrate can be obtained.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
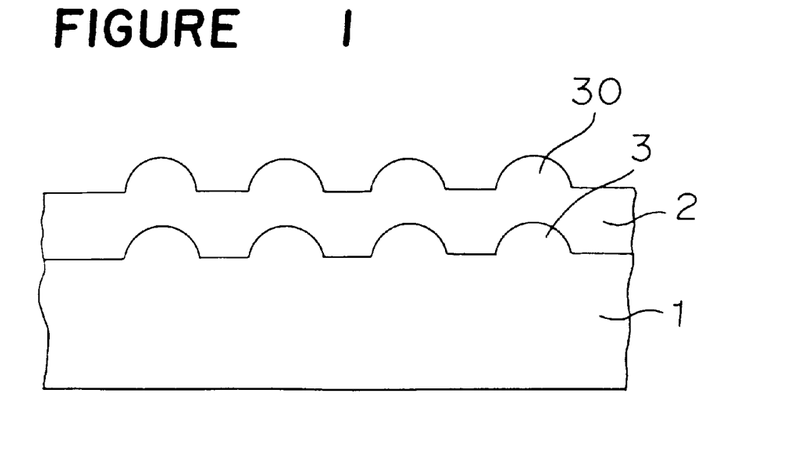
FIG. 1 is a diagram in cross section of a magnetic recording medium according to an embodiment of the present invention.

FIG. 1 is a diagram showing a cross sectional view of an embodiment of a magnetic recording medium according to the present invention wherein reference numeral 1 designates a non-magnetic brittle substrate having a substantially flat surface, which has a physical property of $0.5 < E_v/(D/20)^2 < 6$ μJ where $E_v$ μJ represents the energy for initiating vaporization when a pulsed laser having a wavelength λ is irradiated with a waist diameter D μm on the substrate. For the non-magnetic brittle substrate, glass, glass ceramics or ceramics is desirable. However, another non-magnetic brittle substrate such as a carbon substrate to which the same mechanism of forming the laser marks applies can be used. Further, a substrate composed of a composite material wherein the above-mentioned material is laminated on another kind of material may be used.

Further, it is desirable that the surface of the substrate is mirror-finished to have a fine roughness of less than 10 Å prior to the irradiation of the laser beam in order to avoid an undesirable physical contact with the head and to control the dispersion of the height of the laser marks in a narrow range.

In FIG. 1, a number of laser marks 3 of a height of 10–500 Å, preferably, 10–300 Å are formed in the surface of the non-magnetic brittle substrate. When the height H is less than 10 Å, the prevention of the sticking of the head by the laser marks can not be expected. The upper limit of the height of the laser marks is determined by a flying height of head required in this technical field because the height of the laser marks directly determines the lowest fly height for the head. From the viewpoint of increasing a magnetic recording density, it is required for the upper limit to be 500 Å, preferably, 300 Å.

Reference numeral 2 designates a magnetic layer of a Co based ferromagnetic alloy of 50–500 Å thickness, which is formed by a sputtering method, or a vacuum metallizing method or the like. In the substrate structure of the present invention, at least a magnetic layer is formed on the non-magnetic brittle substrate. However, a barrier layer having a corrosion resistance property and/or an under layer for controlling the crystal growth of the magnetic layer may be formed between the non-magnetic brittle substrate and the magnetic layer. For the barrier layer, Cr or Ti based material can be used. Further, for the underlayer, NiP or Cr based material can be used.

A protective layer and/or lubricant layer may be formed on the magnetic layer 2. The protective layer may be a carbon layer, a hydrogenated carbon layer, a carbon nitride layer, a hydrogenated carbon layer containing nitrogen, a carbide layer such as TiC, SiC or the like, or an oxide layer such as $ZrO_2$. For the lubricant layer, a film of a perfluoropolyether type lubricant having a thickness of 5–50 Å is used, for example.

The shape of the laser marks 3 formed in the brittle substrate is maintained in the outermost surface of the magnetic recording medium through a barrier layer, an under layer, a magnetic layer, a protective layer and a lubricant layer formed thereon, as shape-changing portions 30 having the substantially same shape as the laser marks 3, thus, a texture is formed in the front surface of the magnetic recording medium by which a frictional force between the head and the disk is reduced.

Figure 2:
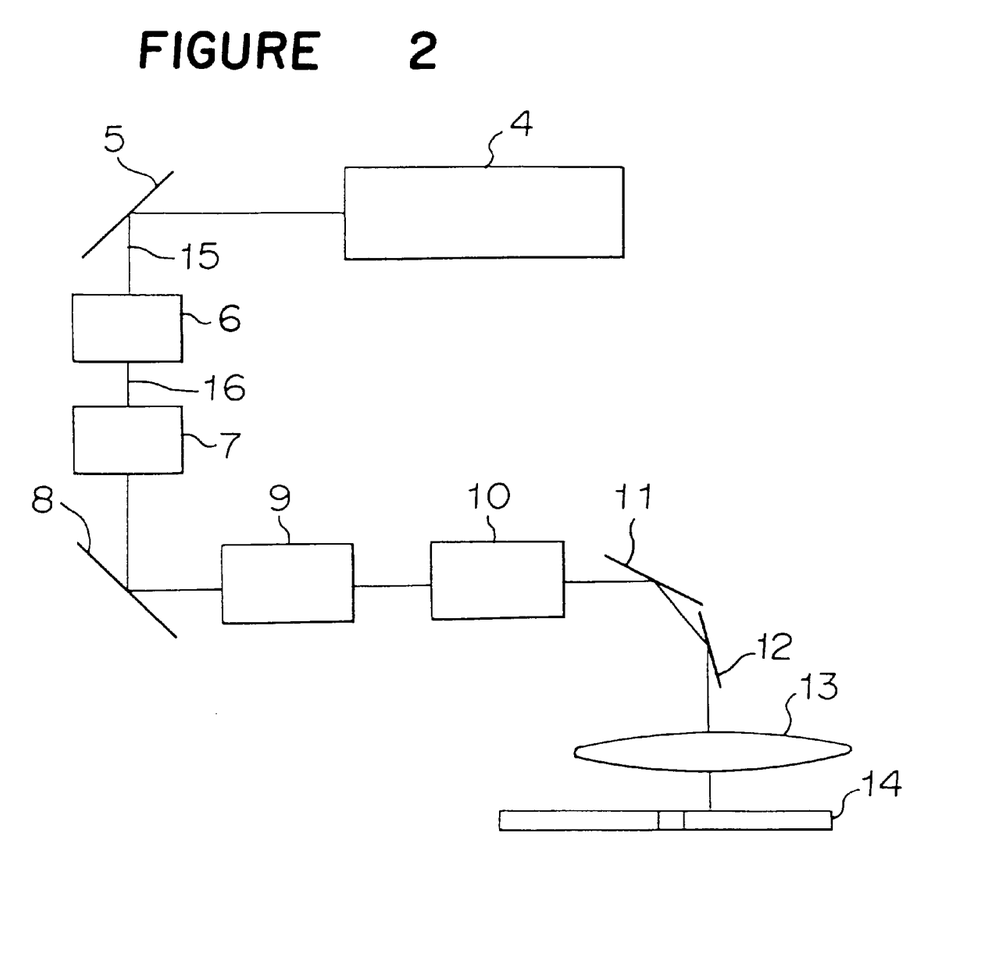
FIG. 2 is a block diagram of a laser texture processing apparatus used to form the substrate for the magnetic recording medium of the embodiment of the present invention.

FIG. 2 shows an example of the structure of an apparatus capable of irradiating a pulsed laser beam onto the non-magnetic brittle substrate to form laser marks as a texture. Numeral 4 designates a YAG Q switched pulsed laser device. The device includes therein a non-linear optical element whereby a pulsed laser energy 15 having a wavelength of 532 nm which is the second harmonics of the fundamental wave (wavelength: 1064 nm) of YAG is generated.

The generated energy is introduced to the non-linear optical element 6 by means of a reflection mirror 5, and a pulsed laser energy 16 of 4th harmonics (wavelength: 266 nm) is generated by wavelength conversion.

Besides the YAG laser, any laser having a wavelength capable of being absorbed by the material to be processed may be used. A solid state laser such as YLF, $YVO_4$ or the like, an excimer laser, an argon laser can be selected. When the non-magnetic brittle substrate is glass, the glass has strong absorption nature in an ultraviolet region and an infrared region of more than 3 $\mu$m, it is preferable to use the 4th harmonics of the YAG laser, the YLF laser, and the $YVO_4$ laser, or the excimer laser or the second harmonics of a visible light region of the argon laser whose wavelengths fall in these regions. Further, a $CO_2$ laser may be used.

The laser beam 16 is introduced through an attenuator 7 for controlling irradiated energy, a reflection mirror 8 and an aperture 9 for shaping the laser beam into a desired shape to an expander 10 which controls the laser beam to have a predetermined distribution on the surface to be recorded. Then, the laser beam is introduced onto the surface of the brittle substrate 14 through a galvano mirror (X axis) 11, a galvano mirror (Y axis) 12 and an objective lens 13. The pulsed laser beam 16 is deflected by driving the galvano mirror (X axis) 11 and the galvano mirror (Y axis) 12 to be dispersively irradiated onto the surface of the substrate which is fixed. As a result, a number of laser marks are dispersively formed in a concentric form, a spiral form or a desired pattern on the substrate by controlling the movement of the galvano mirrors movable in two axes X and Y in association with a repetition frequency of the pulsed laser beam.

Formation of a number of laser marks may be realized by other than the method of deflecting the laser beam by means of the above-mentioned galvano mirrors 11, 12. For example, laser marks can dispersively be formed in a spiral form or a concentric form by fixing the position of a laser beam and rotating a spindle on which the brittle substrate is mounted while the spindle is moved in the radial direction in association with the rotation of the spindle. In this case, however, the laser beam source can be moved in the radial direction instead of moving the spindle.

The dispersively formed laser marks can be obtained by another method other than using the Q switch pulsed laser 4 shown in FIG. 2. For example, a pulsed laser beam obtained by modulating a continuous wave laser with an EOM or an AOM can be used. Further, a number of laser marks can be formed at a time by irradiating a laser light to the substrate by means of a mask having a predetermined pattern.

It is supposed that a lifting portion is formed in the substrate according to the mechanism as follows. When irradiation of the pulsed laser beam is effected in a time determined by a width of a pulse, an irradiated area of a glass material is heated to a high temperature and is expanded in volume (reduction of the density). Since the area not subjected to the irradiation of the laser beam which is around the irradiated area has a large heat capacity, the irradiated area is rapidly cooled at a rate which can not maintain the thermal equilibrium. As a result, after cooling, the irradiated area takes a volume slightly larger than the original volume (i.e., a density smaller than the original density), thus, a lifting portion is formed. Accordingly, a lifting portion extending outside with respect to the surface of the substrate is considered to be the total sum of an increase in the volume of the irradiated area which is heated by the laser beam.

When a pulsed laser beam having a higher energy is irradiated, temperature at a part of the irradiated area exceeds a vaporization temperature of the material, and vaporization of the material is initiated. At this stage, a process of forming a lifting portion due to the increase of volume and a process of vaporization of the material at an elevated temperature portion in a part of the irradiated area (at the central portion in a case of using a focused laser) occur simultaneously, whereby a sink type or a crater type laser mark which has a lifting portion at the peripheral portion and a recess at the central portion, can be obtained.

Although a crater type laser mark similar to the above-mentioned is obtainable in a case of using a NiP alloy, it is considered that the formation of the crater type laser mark is resulted from a volume rearrangement of fused material due to a distribution of surface tension which is generated by a temperature distribution by the irradiation of the laser beam, and the mass before and after the formation of the laser mark is balanced. On the other hand, in the case of the glass material used for the present invention, the crater type laser mark is resulted from the volume expansion and the volume vaporization, and the mass before and after the formation of the laser mark is not balanced, and on the contrary, the mass after the formation is decreased.

A paper "Laser Texture on Alternative substrate Disks (E. Teng, W. Goh, and A. Eltoukhy StorMedia Inc., 1996 Intermag)" describes a lifting portion forming mechanism caused by irradiating a laser beam on glass ceramics in which there is a proposal of expansion of volume due to a change from crystallization (higher density) to a non-crystallization (lower density) by the application of a laser energy.

The inventor of this application thinks that the mechanism of forming a lifting portion in a glass ceramics material in which crystal regions exist in a non-crystal region derives from either the reduction of density due to the material being subject to a rapid cooling step and/or volume expansion due to the change from crystallization to non-crystallization.

Anyway, the main cause of the formation of laser marks in a brittle material such as glass, glass ceramics, or the like is due to expansion of volume in an area to which a laser beam is irradiated to elevate temperature. Since the expansion of the volume at this area is closely related to the depth of penetration of the applied laser energy into the substrate, it seems necessary to make the depth of penetration of the applied energy to be small in order to prevent forming of excessively large laser marks.

Figure 7:
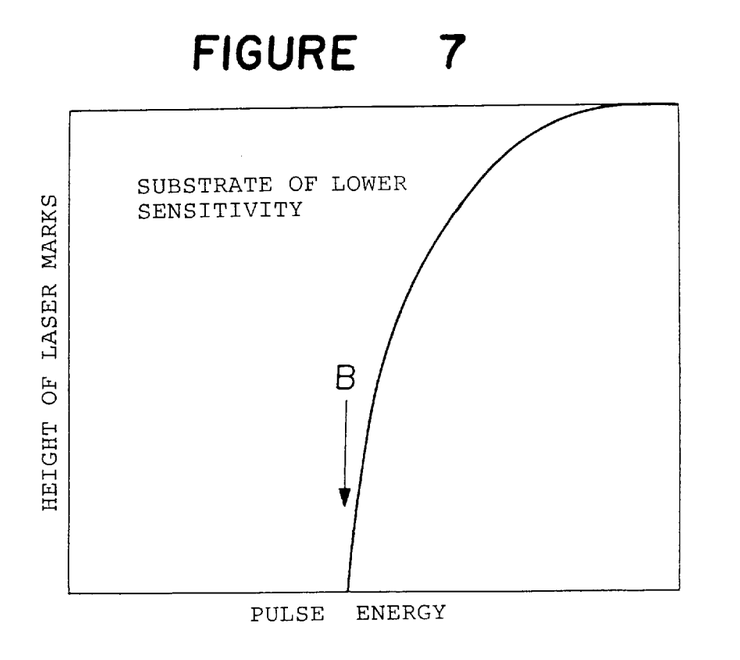
FIG. 7 is a graph showing a relation of a pulse energy to a height of laser mark in a substrate of material having a low sensitivity.

The depth of penetration of the laser energy into the substrate varies depending on the sensitivity of the substrate to the laser energy. In a substrate having a lower sensitivity to the laser energy, the laser energy incident on the substrate is not substantially absorbed at or near the substrate surface. Accordingly, the depth of the area subjected to heating and the resultant expansion is large with the result that the height of a lifting portion is remarkably high, and it is difficult to control the laser mark to be a height of 10–500 Å, preferably, 10–300 Å. In addition, since a higher pulse energy is needed (an arrow mark B in FIG. 7) for initiating lifting in the substrate, an increase in the height of the laser mark in correspondence to a value of the pulse energy is steep as shown in FIG. 7. Accordingly, in addition to the difficulty in controlling the height of the laser mark to be a predetermined height, the dispersion of the height of the laser marks is large when there is variation of the energy of laser.

Figure 6:
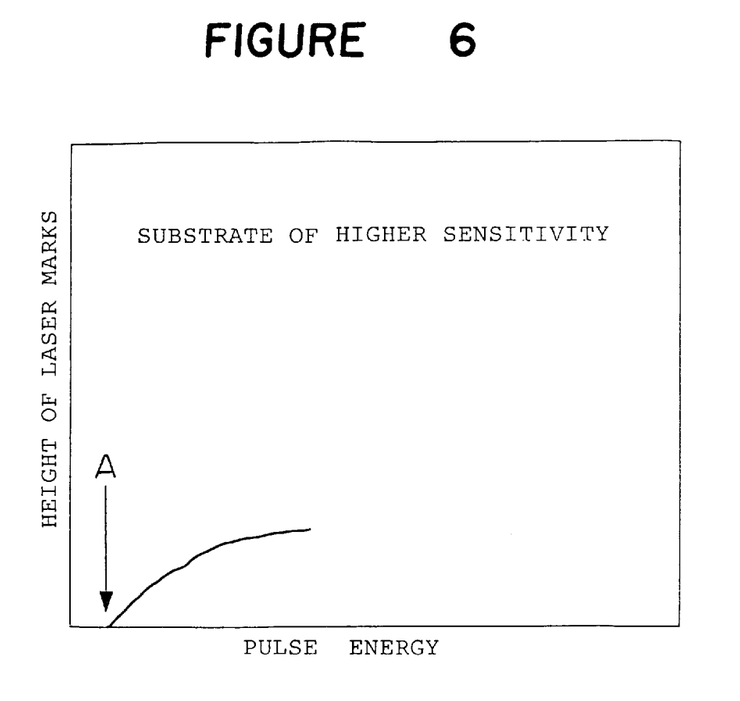
FIG. 6 is a diagram showing a relation of a pulse energy to a height of laser mark in a substrate using material of high sensitivity.

On the other hand, in a substrate having a higher sensitivity to the laser, the laser energy incident onto the substrate is substantially absorbed at or near the substrate surface. Accordingly, the depth of penetration of a laser beam, i.e., the depth of the area subjected to heating and the resultant expansion by the laser beam is small with the result that the height of a lifting portion can be controlled to be a height of 10–500 Å, preferably, 10–300 Å. A pulse energy (an arrow mark A in FIG. 6) by which lifting initiates in the substrate, is low, and a rate of an increase of the height of the laser mark to an increase of pulse energy value is mild as shown in FIG. 6. Accordingly, a dispersion of the height of the laser marks can be made small even though there is variation of laser pulse energy.

Now, the present invention will be described in detail with reference to Examples. However, it should be understood that the present invention is by no means restricted by such specific Examples.

Laser processing was effected to various kinds of non-magnetic brittle substrates with use of the laser texture processing apparatus shown in FIG. 2 in which the 4th harmonics of a YAG laser (wavelength λ=266 nm) was used as a pulsed laser beam.

In Examples 1, 2 and 3 and Comparative Examples 2 and 3, disk-like glass substrates were used as substrates for hard disks, which were prepared by incorporating different amounts of $Fe_2O_3$ and $CeO_2$ as a light absorbing agent to commercially available soda-aluminosilicate glass in order to increase their sensitivity to the above-mentioned wavelength of laser beam. The content (% by weight) of the light absorbing agents for each of the substrates is shown in Table 1. The glass substrate of Comparative Example 2 has the least content, and the content is increased in the order of Comparative Example 3, Example 1, Example 2 and Example 3, which has the largest content.

TABLE 1

|  | Examples | | | Comparative Examples | |
| --- | --- | --- | --- | --- | --- |
|  | 1 | 2 | 3 | 2 | 3 |
| $Fe_2O_3$ | 2 | 3 | 7 | 0.5 | 0.9 |
| $CeO_2$ | 2 | 3 | 7 | 0.5 | 0.9 |

Accordingly, the sensitivity to the above-mentioned wavelength of laser beam is the lowest in Comparative Example 2 and the highest in Example 3. The glass substrate in Comparative Example 1 was of another commercially available soda-aluminosilicate glass and did not contain the light absorbing agent, and therefor, the sensitivity is lower than the glass substrate of Comparative Example 2.

Generally, the sensitivity of a substrate to a laser beam can be expressed by an absorption coefficient of the substrate with respect to the wavelength of the laser beam. The absorption coefficient is obtained by measuring a transmittance to the substrate having a known thickness. In measuring the transmittance of the 4th harmonics of the YAG laser beam, it was very slight in the glass substrate of 0.635 nm thickness in Comparative Example 1, and the absorption coefficient could not be obtained. In the measurement of the transmittance of each glass substrate of Examples 1, 2 and 3 and Comparative Examples 2 and 3 each having a thickness of 0.635 nm, the absorption coefficient could not be obtained as well because the transmittance was below the limit of detection. Further, even in a case of a thickness of 100 μm, the absorption coefficient could not be obtained. Such results of measurements show that the almost of the irradiated laser energy is supposed to be absorbed in a portion having a depth of 100 μm in Examples 1, 2 and 3 and Comparative Examples 2 and 3.

Thus, since it was found to be difficult to express the sensitivity of the substrates to the laser beam by means of the absorption coefficient, the inventor has decided to identify the sensitivity of glass substrates by using a pulse energy value $E_v(\mu J)$ which can initiate vaporization in the substrates when a pulsed laser beam is irradiated. Since material having a higher sensitivity to a laser beam absorbs the laser energy strongly, vaporization is initiated at a lower pulse energy. On the other hand, since material having a lower sensitivity has difficulty absorbing the laser energy, a higher pulse energy is needed to initiate vaporization.

Hereinbelow, a value $E_v/(D/20)^2(\mu J)$ which is obtained by standardizing a pulse energy for initiating vaporization with respect to a waist diameter of 20 μm is used as a sensitivity of a substrate material to a pulsed laser beam. Namely, a substrate material having a larger $E_v/(D/20)^2$ has a lower sensitivity to an irradiated pulsed laser beam. On the other hand, a substrate material having a smaller $E_v/(D/20)^2$ has a higher sensitivity to the laser beam.

First, a pulsed laser beam is irradiated with a pulse energy of specified value to a glass substrate to thereby form a plurality of laser marks on the glass substrate. Each laser mark is formed by the application of each pulse. When a pair of galvano mirrors is deflected for each pulse, a group of laser marks with certain intervals is formed. In these Examples, the intervals of the laser marks were 60 μm in the radial direction and the circumferential direction. Then, by gradually changing the value of the pulse energy and by repeating a step of forming laser marks in correspondence to respective values of pulse energy, laser marks which were in response to the pulse energy of each of the values were formed on the glass substrate. The pulse energy was changed by changing the peak value of the pulsed laser beam, but without changing the pulse width.

The height of the laser marks formed by the application of various values of pulse energy was measured with use of an optical surface profile measuring device (tradename: ZYGO, manufactured by ZYGO Company). Further, the shape of the laser marks corresponding to various pulse energy values was observed with the measuring device, and a value $E_v(\mu J)$ for initiating vaporization was obtained by a pulse energy value at which the shape of the laser marks was changed from the simple lifting type (FIG. 3) to the sink type (FIG. 4).

Process parameters in laser processing are as follows:
Pulse repetition rate=5 kHz,
Laser pulse width=65 nsec,
Focal length of objective lens=150 mm, and
Waist diameter D=10 μm.

Figure 8:
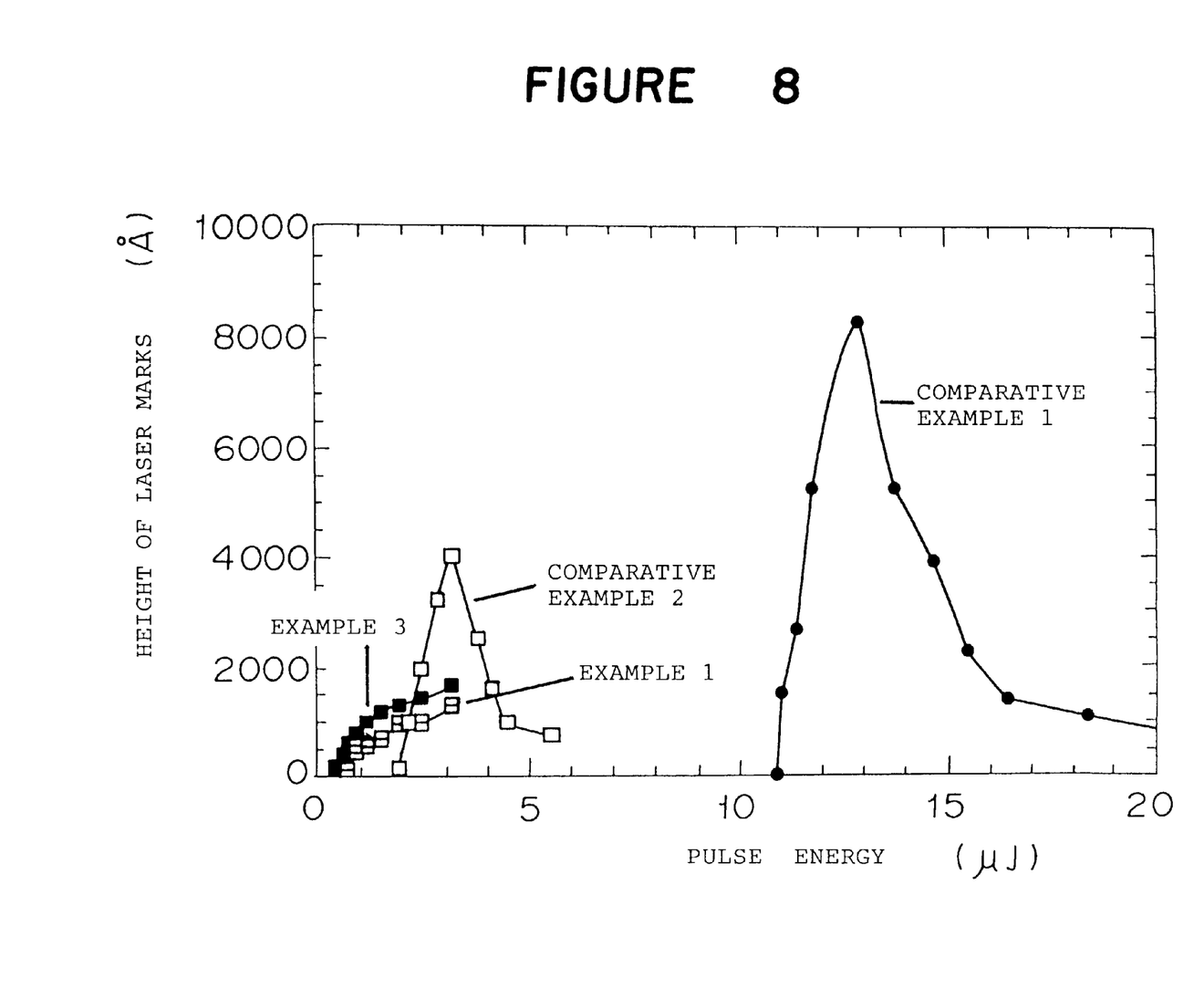
FIG. 8 is a graph showing a relation of a pulse energy to a height of laser mark in Examples 1 and 3 and Comparative Examples 1 and 2.

FIG. 8 shows a relation of irradiated pulsed energy values and the height of the laser marks in Examples 1 and 3, and Comparative Examples 1 and 2. Examples 1 and 3 correspond to the diagram of FIG. 6 and Comparative Examples 1 and 2 correspond to the diagram of FIG. 7. The slopes of curves for Examples 1 and 3 are mild, and those for Comparative Examples 1 and 2 are steep.

Table 2 shows data on the pulse energy value $E_v(\mu J)$ for initiating vaporization, the vaporization initiating energy $E_v(\mu J)/(D/20)^2$ standardized with respect to a waist diameter of 20 $\mu$m, the height of laser marks $H_v(Å)$ when an irradiated pulse energy is $E_v(\mu J)$, an irradiated pulse energy value $E_{250}(\mu J)$ to obtain a height of laser marks of 250 Å, and the allowed variation of irradiated pulse energy $\Delta E/E_{250}$ to make a height H within a range of ±5%. i.e., 250 Å ±13 Å. In Table 2, $\Delta E=(E_{263}-E_{237})$ wherein $E_{263}$ represents an irradiated pulse energy to obtain a height of 263 Å and $E_{237}$ represents an irradiated pulse energy to obtain a height of 237 Å. $\Delta E/E_{250}$ indicates allowable variation (%) of an irradiated pulse energy required for a variation in the height of the laser marks within ±5%. A larger value means that material used has a higher tolerance to a variation of laser power, and therefor, a higher value is preferable.

TABLE 2

|  | $E_v$ $\mu J$ | $E_v/(D/20)^2$ $\mu J$ | $H_v$ Å | $E_{250}$ $\mu J$ | $\Delta E/E_{250}$ % |
|---|---|---|---|---|---|
| Example 1 | 1.1 | 4.4 | 550 | 0.70 | 3.4 |
| Example 2 | 0.5 | 2.1 | 260 | 0.51 | 9.8 |
| Example 3 | 0.4 | 1.7 | 230 | 0.55 | 8.4 |
| Comparative Example 1 | 13.0 | 51.8 | 8240 | 8.62 | 0.4 |
| Comparative Example 2 | 3.1 | 12.5 | 4010 | 1.87 | 0.5 |
| Comparative Example 3 | 2.4 | 9.6 | 1580 | 1.17 | 0.9 |

In a case of the YAG laser as used in the Examples, for instance, the width of variation of the laser power is about 2% in terms of the fundamental wavelength. Further, by converting the wavelength to the 2nd harmonics, the 4th harmonics and the like, stability in the laser power is known to decrease. Table 2 shows that there is a difficulty in controlling a dispersion of the height of the laser marks because $\Delta E/E_{250}$ is less than 2% in Comparative Examples 1, 2 and 3. On the other hand, $\Delta E/E_{250}$ is largely beyond 2% in Examples 1, 2 and 3 which indicate an improvement with respect to controllability of the dispersion of the height of the laser marks. Although the same light absorbing agents as in Examples 1, 2 and 3 is contained in Comparative Examples 2 and 3, the content is not sufficient, and it is found that the controllability of the height of the laser marks is not sufficient. Further, when laser marks having a height of 250 Å are to be formed, a required pulse energy in Example 3 is 0.55 $\mu$J, however, it exceeds the pulse energy $E_v(0.42 \mu J)$ for initiating vaporization, and the shape of the laser marks of 250 Å shows the sink type as shown in FIG. 4. On the other hand, in Examples 1 and 2, the irradiated pulsed energy to form the laser marks of 250 Å high does not exceed $E_v$ and it provides the simple lifting type as shown in FIG. 3.

In Examples 1, 2 and 3, there was found no fine cracks in the substrates, and usable textures were obtained.

In Comparative Example 1, the height $H_v$ at $E_v$ reaches 8000 Å. It is understood that when a substrate material in which the sensitivity to laser energy has not in particular been increased is used, laser marks having a height of about 1 $\mu$m are formed as described in EP 062554A. It is unnecessary for the texture in a disk to have such height. It is really required to form laser marks having a height of 500 Å or less, preferably, 300 Å or less with a small dispersion and to obtain a texture constituted thereby. Although it is theoretically possible to form laser marks of a height of 250 Å by suitably selecting an irradiated pulse energy in Comparative Example 1, there is a large change of the height of the laser marks in correspondence to a change of the irradiated energy. Accordingly, a change of the height of the laser marks becomes large in response to a slight change of the irradiated laser energy, and it is very difficult to obtain a texture in which the height of the laser marks is well controlled.

Table 3 shows measured values, with use of an AFM (atomic force micrometer), of the height (Å) of 6 laser marks which are optionally selected in each of Examples 1, 2 and 3 and Comparative Examples 1 and 3 in Table 2, and each dispersion thereof. In Examples 1, 2 and 3, there was found that control of the height was so good that the dispersion of the height is small. On the other hand, in Comparative Examples 1 and 3, there was a very large dispersion of the height. In Comparative Example 1, in particular, as an increase of the height of the laser marks in response to an increase of the pulse energy is steep, adjustment of the pulsed energy was too difficult to form laser marks of a height of 500 Å or less. In order to reduce a flying height of the head in response to an increase of the recording density of a magnetic recording medium, it is necessary to form laser marks in response to a required flying height for the head wherein a dispersion of the height is small as possible. It is necessary that σ is within 5%, desirably within 3% of the average value of the height H where σ represents a dispersion of the height.

As shown in Table 2, in Examples 1, 2 and 3, $E_v/(D/20)^2$ is larger than 0.5 $\mu$J and smaller than 6 $\mu$J. Further, as shown in Table 3, the standard deviation a of the height H of the laser marks is within 5% with respect to the average value of H. Especially, in Examples 2 and 3, the standard deviation is within 3%.

TABLE 3

|  |  |  | Example | | | Comparative Examples | |
|---|---|---|---|---|---|---|---|
|  |  |  | 1 | 2 | 3 | 1 | 3 |
| Pulsed energy ($\mu$J) | | | 0.85 | 0.52 | 0.52 | 9.9 | 1.26 |
| Height of laser marks (Å) | Measured volume | 1 | 476 | 258 | 225 | 2622 | 522 |
| | | 2 | 489 | 249 | 238 | 1984 | 485 |
| | | 3 | 471 | 251 | 232 | 3536 | 415 |
| | | 4 | 446 | 267 | 225 | 4678 | 448 |
| | | 5 | 436 | 259 | 237 | 2755 | 435 |
| | | 6 | 486 | 262 | 223 | 2047 | 465 |
| Average value | | | 467 | 258 | 230 | 2934 | 462 |
| Maximum value | | | 489 | 267 | 7238 | 4678 | 522 |
| Minimum value | | | 436 | 249 | 223 | 1964 | 415 |
| σ | | | 22 | 7 | 7 | 1026 | 38 |
| σ/Average value | | | 4.6 | 2.7 | 2.9 | 35 | 8.2 |

Table 4 shows results of forming laser marks in substrates of Examples 4 through 6 and Comparative Examples 4 and 5. A pulsed laser beam used was the 4th harmonics of a YAG laser (wavelength $\lambda$=266 nm).

The substrates used in Examples 4, 5 and 6 are respectively the same as those used in Examples 1, 2 and 3, and the substrates used in Comparative Examples 4 and 5 are respectively the same as those used in Comparative Examples 2 and 3.

Process parameters in laser processing are as follows (only the waist diameter is different from that in Examples 1 through 3 and Comparative Examples 2 and 3):

Pulse repetition rate=5 kHz,

Laser pulse width=65 nsec,

Focal distance of objective lens=150 mm, and

Waist diameter D=20 μm.

TABLE 4

|  | $E_v$ μJ | $E_v/(D/20)^2$ μJ | $H_v$ Å | $E_{250}$ μJ | $\Delta E/E_{250}$ % |
|---|---|---|---|---|---|
| Example 4 | 4.0 | 4.0 | 420 | 2.51 | 4.4 |
| Example 5 | 2.2 | 2.2 | 300 | 2.05 | 9.2 |
| Example 6 | 1.8 | 1.8 | 210 | 2.74 | 10.4 |
| Comparative Example 4 | 16.9 | 16.9 | 3190 | 0.6 | 0.6 |
| Comparative Example 5 | 8.6 | 8.6 | 1150 | 1.8 | 1.8 |

In Table 4, Comparative Examples 4 and 5 show that there is a problem in controlling the height of the laser marks because $\Delta E/E_{250}$ values do not reach 2%. On the other hand, in Examples 4, 5 and 6, $\Delta E/E_{250}$ values largely exceed 2%, and there is an improvement on controllability of the laser marks. Although the substrates of Comparative Examples 4 and 5 contain the same light absorbing agents as in Examples 4, 5 and 6, the content is insufficient, and which reveals that effect of the agents on the controllability of the height of the laser marks is insufficient. When laser marks having a height of 250 Å are formed, a required irradiated pulsed energy in Example 6 is 2.7 μJ, which is beyond a pulsed energy value $E_v$(1.8 μJ) for initiating vaporization. In this case, the shape of the laser marks of the 250 Å shows the sink type as shown in FIG. 4. On the other hand, in Examples 4 and 5, the irradiated pulsed energy for forming laser marks of 250 Å does not exceed $E_v$. In this case, the shape is the simple lifting type as shown in FIG. 3.

Table 4 shows that in Examples 4, 5 and 6, $E_v/(D/20)^2$ values are respectively larger than 0.5 μJ and smaller than 6 μJ.

In the above-mentioned Examples, the 4th harmonics of a YAG laser (wavelength: 266 nm) is used as the laser beam. Since the absorption band of the ordinary glass material is in an ultraviolet region and an infrared region of more than 3 μm, it is easier to increase the sensitivity to a laser beam having a wavelength falling in these regions. However, the present invention is not limited to using such laser beam, and any combination of a laser wavelength and the sensitivity of a substrate which realizes the condition of $0.5<E_v/(D/20)^2<6$ μJ may be utilized.

Table 5 shows a result of forming laser marks in Example 7 and Comparative Example 6.

In Example 7 and Comparative Example 6, substrates made of glass ceramics (crystalline glass) which have different compositions from each other are used. The glass ceramics are such material that crystallized glass particles exist in amorphous glass.

The pulsed laser beam used was the 4th harmonics of a YAG laser beam (wavelength λ=266 nm).

Process parameters in laser processing with the pulsed laser are as follows:

Pulse repetition rate=5 kHz,

Laser pulse width=65 nsec,

Focal length of objective lens=150 mm, and

Waist diameter D=20 μm.

TABLE 5

|  | $E_v$ μJ | $E_v/(D/20)^2$ μJ | $H_v$ Å | $E_{250}$ μJ | $\Delta E/E_{250}$ % |
|---|---|---|---|---|---|
| Example 7 | 2.1 | 2.1 | 400 | 1.38 | 4.0 |
| Comparative Example 6 | 20.0 | 20.0 | 1750 | 12.3 | 1.0 |

In Table 5, since $\Delta E/E_{250}$ is less than 2% in Comparative Example 6, it is understood that there is a problem in controlling the height of the laser marks. On the other hand, in Example 7, $\Delta E/E_{250}$ largely exceeds 2%, and therefor, there is found an improvement of controllability of laser marks. The substrate of Comparative Example 6 contains $V_2O_5$ as a light absorbing agent. However, the content is not sufficient, and it is understood that the effect on controllability of the height of the laser marks is insufficient. Further, the substrate of Example 7 contains $TiO_2$ as a light absorbing agent. In a case of forming laser marks of a height of 250 Å in Example 7, a required irradiated pulse energy is 1.38 μJ which is less than $E_v$(2.1 μJ), the pulse energy for initiating vaporization. In this case, the shape of the laser marks of 250 Å was of the simple lifting type as in FIG. 3.

In Table 4, $E_v/(D/20)^2$ in Example 7 is larger than 0.5 μJ and smaller than 6 μJ. From the above, an improvement in controllability of forming laser marks can be recognized even in a substrate made of a glass ceramics material as far as it satisfies $0.5$ μJ$<E_v/(D/20)^2<6$ μJ in the same manner as the glass material.

According to the present invention, the following excellent advantages can be provided.

(1) Laser marks constituting a texture can be formed with high precision so that the height falls in a small range (i.e., 500 Å or less, preferably, 300 Å or less) whereby a low flying height of a magnetic head is obtainable.

(2) A dispersion of the height of laser marks constituting a texture can be suppressed to be small whereby a lower flying height of a magnetic head and durability in CSS can be simultaneously satisfied thereby improving in recording capacity.

(3) With use of the substrate of the present invention, it is possible to use a laser beam of small power to thereby reduce cost and space in production line.

(4) By increasing a pulse repetition rate, a time for forming the texture can be shortened to thereby increase productivity. However, when a Q switch pulse solid state laser such as YAG is used and if the pulse repetition rate is increased, energy per pulse is decreased, which makes it difficult to form laser marks. Use of the substrate according to the present invention makes it possible to form a texture with a lower energy. Accordingly, productivity can be increased by increasing the pulse repetition rate.

(5) A tolerance to variation of an irradiated laser beam energy is large, and production in an industrial scale for magnetic recording medium is easy.

Obviously, numerous modifications and variations of the present invention are possible in light of the above teachings. It is therefore to be understood that within the scope of the appended claims, the invention may be practiced otherwise than as specifically described herein.

What is claimed is:

1. A substrate for a magnetic recording medium which comprises a non-magnetic brittle material having a substantially flat surface on which a plurality of laser marks are formed each having a projection of a height in a range of 10–500 Å in at least a part of it, the laser marks being formed by irradiating a pulsed laser beam having a wavelength capable of being absorbed by the non-magnetic brittle material within a range of substantially circular form having a waist diameter D $\mu$m, and which has a physical property of $0.5 < E^v/(D/20)^2 < 6$ $\mu$J where $E^v$ $\mu$J represents a pulse energy value for initiating vaporization of the substrate by irradiation of the pulsed laser beam.

2. The substrate according to claim 1, wherein the non-magnetic brittle material is glass or glass ceramics.

3. The substrate according to claim 1, wherein the pulsed laser beam having a wavelength capable of being absorbed by the non-magnetic brittle material is the 4th harmonics of a YAG laser, the 4th harmonics of a YLF laser or the 4th harmonics of a $YVO_4$ laser.

4. The substrate according to claim 1, wherein the height of the projections as laser marks has a dispersion of standard deviation $\sigma$, wherein $\sigma$ is 5% or lower of an average value of the height.

5. The substrate according to claim 1, wherein there are a landing zone and a data zone on the surface of the substrate, and the laser marks are formed only in the landing zone.

6. A magnetic recording medium which comprises:

a substrate formed of a non-magnetic brittle material having a substantially flat surface on which a plurality of laser marks are formed each having a projection of a height in a range of 10–500 Å in at least a part of it, the laser marks being formed by irradiating a pulsed laser beam having a wavelength capable of being absorbed by the non-magnetic brittle material within a range of substantially circular form having a waist diameter D $\mu$m, and which has a physical property of $0.5 < E^v/(D/20)^2 < 6$ $\mu$J where $E^v$ $\mu$J represents the pulse energy value for initiating vaporization of the substrate by irradiation of the pulsed laser, and at least one layer including a magnetic layer formed on the substrate.

7. The magnetic recording medium according to claim 6, wherein the non-magnetic brittle material is glass or glass ceramics.

8. The magnetic recording medium according to claim 6, wherein the pulsed laser beam having a wavelength capable of being absorbed by the non-magnetic brittle material is the 4th harmonics of a YAG laser, the 4th harmonics of a YLF laser or the 4th harmonics of a $YVO_4$ laser.

9. The magnetic recording medium according to claim 6, wherein the height of the projections as laser marks has a dispersion of standard deviation $\sigma$, wherein $\sigma$ is 5% or lower of an average value of the height.

10. The magnetic recording medium according to claim 6, wherein there are a landing zone and a data zone in the surface of the substrate, and the laser marks are formed only in the landing zone.

* * * * *

UNITED STATES PATENT AND TRADEMARK OFFICE
CERTIFICATE OF CORRECTION

PATENT NO. : 5,978,189
DATED : November 2, 1999
INVENTOR(S) : Fuyuki Habu

It is certified that error appears in the above-identified patent and that said Letters Patent is hereby corrected as shown below:

Abstract,
Line 9, change "$0.5<E^{\upsilon}//20^2<6\mu$ J where $E^{\upsilon}$ μ J" to --$0.5\ E_v(D/20)^2<6$ μ J where $E_v$ μ J--.

Column 2,
Line 56, change "$E_{\upsilon}$ to --$E_v$ on both occurrences.

Column 3,
Lines 48, 49 and 51, change "$E\upsilon$" to --$E_v$--.

Column 4,
Lines 22 and 28, change "$E_{\upsilon}$" to --$E_v$--.

Column 6,
Lines 14 and 15, change "$E_{\upsilon}$" to --$E_v$--.

Column 10,
Lines 19, 26, 30, 32 and 54, change "$E_{\upsilon}$" to --$E_v$--.

Column 11,
Lines 5, 7, 9, 56 and 60, change "$E_{\upsilon}$" to --$E_v$--; and
Lines 8 and 60, change "$H_{\upsilon}$" to ---$H_v$--.

Column 12,
Line 31, change "$E_{\upsilon}$" to --$E_v$--; and
Line 33, change "the standard deviation a" to --the standard deviation σ--.

Column 13,
Lines 35, 39, 41 and 52, change "$E_{\upsilon}$" to --$E_v$--.

Column 14,
Lines 26, 29, 29 and 33, change "$E_{\upsilon}$" to --$E_v$--.

UNITED STATES PATENT AND TRADEMARK OFFICE
CERTIFICATE OF CORRECTION

PATENT NO.    : 5,978,189  
DATED         : November 2, 1999  
INVENTOR(S)   : Fuyuki Habu Page 2 of 2

It is certified that error appears in the above-identified patent and that said Letters Patent is hereby corrected as shown below:

Column 15,
Line 8, change "$0.5 < E^v/(D/20)^2 < 6\mu$ J where $E^v$ μ J" to --$0.5\ E_v(D/20)^2 < 6\ \mu$ J where $E_v$ μ J--.

Column 16,
Line 6, change "$0.5 < E^v/(D/20)^2 < 6\mu$ J where $E^v$ μ J" to --$0.5\ E_v(D/20)^2 < 6\ \mu$ J where $E_v$ μ J--.

Signed and Sealed this

Third Day of July, 2001

*Attest:*

Nicholas P. Godici

*Attesting Officer*

NICHOLAS P. GODICI
*Acting Director of the United States Patent and Trademark Office*